United States Patent [19]

Nicol

[11] Patent Number: 4,787,978
[45] Date of Patent: Nov. 29, 1988

[54] METHOD FOR THE PURIFICATION OF WASTE WATER, NOTABLY OF URBAN WASTE WATER

[75] Inventor: Roger Nicol, Issy Les Moulineaux, France

[73] Assignee: Degremont, S.A., Rueil-Malmaison Cedex, France

[21] Appl. No.: 7,634

[22] Filed: Jan. 28, 1987

[30] Foreign Application Priority Data

Feb. 7, 1986 [FR] France .................. 86 01704

[51] Int. Cl.$^4$ .............................................. C02F 3/30
[52] U.S. Cl. .................................. 210/605; 210/622; 210/624; 210/903
[58] Field of Search ............... 210/603, 625, 630, 605, 210/607, 617, 622–624, 626, 903

[56] References Cited

U.S. PATENT DOCUMENTS

| | | | |
|---|---|---|---|
| 4,067,801 | 1/1978 | Ishida et al. | 210/603 |
| 4,076,615 | 2/1978 | Olesen et al. | 210/625 X |
| 4,134,830 | 1/1979 | Skogman et al. | 210/603 |
| 4,267,050 | 5/1981 | Conway et al. | 210/625 X |
| 4,452,699 | 6/1984 | Suzuki et al. | 210/625 X |
| 4,491,522 | 1/1985 | Ishida et al. | 210/603 |

FOREIGN PATENT DOCUMENTS

| | | |
|---|---|---|
| 2447501 | 4/1976 | Fed. Rep. of Germany . |
| 3117805 | 11/1982 | Fed. Rep. of Germany . |
| 3150140 | 6/1983 | Fed. Rep. of Germany . |
| 3405236 | 8/1985 | Fed. Rep. of Germany . |
| 2154851 | 5/1973 | France . |
| 8000300 | 8/1981 | Netherlands . |

Primary Examiner—Tom Wyse
Attorney, Agent, or Firm—Sandler & Greenblum

[57] ABSTRACT

A method for the treatment of activated slurries of waste water, notably of urban waste water, characterized in that the water to be treated, previously subjected to the standard prior treatments such as screening, renewal of sediments, degreasing, and possibly a primary decantation, is directed to a single ventilation or aeration basin with a high mass load where it dwells during a reduced period, from which it is discharged to a clarifier-thickener equipped with inclined parallel plates or tubes, stimulating the separation of the slurry, which is being recycled in the ventilation or aeration basin at a high concentration made necessary by the reduced dwelling time of the water in the basin.

9 Claims, 1 Drawing Sheet

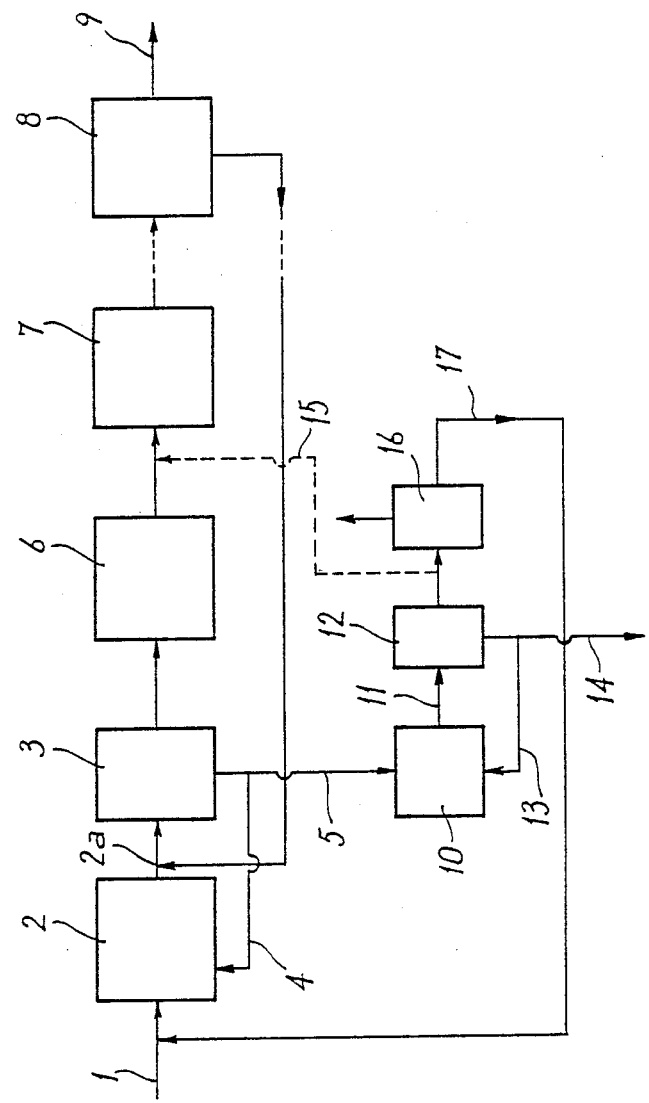

METHOD FOR THE PURIFICATION OF WASTE WATER, NOTABLY OF URBAN WASTE WATER

The present invention relates to a method of and an installation for the treatment of waste water, notably of urban waste water, and of the slurries produced during the treatment.

The conventional purification methods include, using a chain of specialized apparatus providing successively the screening renewal of sediments, degreasing, primary decantation, biological treatment as such by activated slurries in a ventilation or aeration basin, the separation of the treated liquid and slurries formed in a clarification basin, the recycling of the slurries to the ventilation basin and the tertiary treatment of the purified water. The excess slurries discharged from the decanter and from the clarification basin are first thickened, and subjected to a digestion in one or several stages, as well as to dehydration.

The installations thus designed are very bulky. In fact, a long dwelling time is necessary in the ventilation or aeration basin in order to complete the purification. A contact period of at least 2 hours is generally considered as a minimum.

One can reduce the period, and therefore the volume of the basin, by having the purification completed, when necessary, in specialized apparatus placed downstream, for example, for eliminating the nitrogenous compounds by a nitrification-denitrification. But there are limitations to this method due to the clarification basin performance. In fact, in order to reduce the dwelling time in the ventilation or aeration basin, while maintaining the slurries mass load necessary for purification, it would be necessary to increase the concentration of the slurries, that is to obtain at the outlet of the clarification basin an increase of slurry concentration with a ratio reverse to that of the decrease of dwelling time in the ventilation basin.

Likewise, the digestion of the slurries requires long dwelling times, and therefore bulky installations, since the purification of the fermentable organic portion of the slurries and of the interstitial liquid is opposed by the presence of a large volume of non fermentable suspended matters. The object of the present invention therefore is to provide an installation including a combination of apparatus which, on the one hand, reduces the dwelling time in the various treatment phases, and therefore, eliminates the bulk of the assembly forming the water and slurry treatment installation, and on the other hand, reduces the consumption of energy necessary for the oxygenation process.

According to a feature of the invention, the assembly formed by the primary decanter and the ventilation basin is substituted by a single ventilation or aeration basin with a high mass load in which the dwelling time for the water to be treated is short, in the order of 15 minutes. The single ventilation or aeration basing is associated with a clarifier-thickener which is provided with parallel plates or tubes for stimulating the slurries decantation, thus providing a production of slurries which can be recycled in the ventilation or aeration basin, with the high concentration made necessary by the reduced dwelling time of the water in the ventilation or aeration basin.

According to another feature of the invention, the excess slurries produced in the clarifier-thickener are subjected to a two stage biological treatment, a hydrolysis and a methanization, carried out in two distinct apparatus which are each adapted to their function. The hydrolysis treatment is for liquifying the fermentable fraction of the slurries, and separating the remaining slurries which have been made inert by any appropriate method, such as a centrifugation or a microfiltration, prior to the methanization of the residual clear liquid, which is carried out to free the excess slurries from suspended matters which reduce the exchange speed, in an appropriate apparatus, such as an apparatus having an anaerobic fluidized bed.

According to a preferred disposition of the invention, the clear liquid resulting from the separation of the slurries is directed to a denitrifier included in the installation in order to provide it with the required carbonated load. This particularly interesting way of proceeding allows reducing, or even suppressing, the addition of methanol generally used to this effect, and therefore reducing the size, or even suppressing the methanization fluidized bed provided for the treatment of the liquid in question, with a view to its discharge.

According to another disposition of the invention, the slurries discharged from the separator are partially recycled in the hydrolysis reactor, in order to increase the hydrolysis duration.

According to a feature of the invention, the only backflow, to the installation head, originating from the slurries treatment station is that of the water discharged from the methanization fluidized bed, and due to the methanization as such, this water backflow induces a minimum of carbonated pollution.

An embodiment of the installation adapted for practicing the method according to the invention is described hereafter, as an example which is by no way limiting.

BRIEF DESCRIPTION OF THE DRAWINGS

This description is made with reference to the accompanying drawing the single FIGURE of which is a block diagram of such an installation.

DETAILED DESCRIPTION OF THE DRAWINGS

The water to be treated is introduced via a piping 1 into basin 2 where it is treated by the method of activated slurries which eliminates, due to the anaerobic bacteria which it contains, the carbonated pollution. The basin is fed with air or oxygen in proportion to the needs of the purifying aerobic bacteria.

According to the invention, the ventilation or aeration basin 2 is single and has a very high mass load. It is known that the term of mass load expresses the relation between the daily pollution flux expressed in BOD5 and the quanity of dry matter present in the ventilation basin.

Given the object aimed at, it is advisable to have this mass load establisehed at about 1.5 kg BOD5/kgDM/day.

Also according to the invention, the ventilation or aeration basin is associated with a clarifier-thickener tank 3 to which is fed the water discharged by the ventilation basin, via piping 2a.

The clarifier-thickener tank is of the type, known per se, in which the slurries separation is stimulated by the passage of the liquor originating from basin 2 in inclined tubes, or between inclined plates, thereby providing in the clarifier-thickener a particularly high slurry concentration, a portion of which is recycled via piping 4 into ventilation or aeration 2.

Due to the measures according to the invention, there is maintained in basin 2 a large mass of purifying bacteria, which are necessary for the operation of the basin with a very high mass load.

The water, which is free from the carbonated pollution, is advantageously fed to a nitrifier 6, from which it flows to a denitrifier 7 in order to reach a decanter 8 from which it is discharged via a piping 9.

The excess slurries are subjected to an anaerobic treatment with a view to transforming the organic matters into gas ($CH_4 + CO_2$) by strict anaerobic bacteria called methaniferous bacteria. This reaction is carried out in two stages. The organic matter is first transformed into volatile fat acids by a group of bacteria called acidophilic, then the methaniferous bacteria use the vehicle fat acids produced in order to transform them into gas. The anaerobic digestion can be carried out in one or two stages. The process of separating in two stages allows optimizing each of them, and therefore operating under optimal conditions.

In order to carry out the anaerobic digestion, the excess slurries are transferred by piping 5 to a hydrolysis reactor 10, which reactor supplies, via a piping 11, to a separator 12 which can be of any convenient type, made, for example, of a centrifuge, a membrane, etc., providing for the separation of the liquid phase and of the dry matter.

The dry matter forming the solid phase is either recycled via piping 13 into the hydrolysis reactor 10, or discharged via a piping 14.

The liquid portion which is freed from its suspended matter is in part directed via piping 15 to denitrifier 7, to which it supplies the necessary carbon for the denitrification of the effluent arriving from denitrifier 6, thereby avoiding to provide the denitrifier with an outer carbonated supply, in the form of methanol for example. The other portion of the liquid phase is, according to the invention, directed onto an anaerobic fluidized bed 16, from where it is channeled, while containing very little pollution, via piping 17 to piping 1 feeding ventilation or aeration basin 2 with water to be treated.

According to the invention, the choice of the operating parameters, associated with the characteristic dispositions of the invention, contributes to the desired energy and space savings.

One chooses an elimination efficiency of the carbonated pollution of the order of 60 to 80%, instead of 80 to 90% in the installations usually erected, which allows adopting a mass load of the order of 1.5 kg BOD5/kg DM/day (instead of 0.1 to 1 kg). On the other hand, the use of a clarifier-thickener allows maintaining high concentrations of active slurries in the biological basin, viz. adopting volume loads of the order of 10 to 15 kg BOD5/m³/day (instead of 0.5 to 2.5 kg usually).

The combination of the primary decanter and the ventilation basin allows a saving of space due to the volume load and a saving of energy due to the efficiency and the mass load.

The characteristic dispositions of the slurries treatment, the production of which increases with the mass load, contribute to the required results.

The fact that the hydrolysis and methanization are carried out in separated apparatus, each of them being designed for their specific function, improves the compactness and the efficiency of each of them.

The separation of the inert matters reduces the volume to be methanized and increases the methanization efficiency. The result is that the overloading imposed to the biological treatment by the recycling of the methanized effluent, which is the only recycled effluent, is less than 2.5% of the influential load, while it is from 10 to 20% in the standard installations.

The result contributes to the energy saving of the biological treatment and to the saving of space of the whole assembly. The energy saving is of the order of 30% and the saving of space of the order of 50% as compared with the installations made in the standard way.

What I claim is:

1. A method for treating waste water comprising the steps of:
   (a) introducing waste water into a single aeration basin with a high mass load, said aeration basin including a predetermined amount of purifying bacteria;
   (b) purifying said waste water by allowing said waste water to dwell in said single aeration basin for a predetermined period of time, thereby allowing said purifying bacteria to react with carbonated pollutants present in said waste water;
   (c) separating the purified water obtained in step (b) into a slurry and a liquid portion by discharging the purified water into a clarifier-thickener apparatus;
   (d) recycling a first portion of said slurry in said single aeration basin and supplying a second portion of said slurry to a hydrolysis reactor for a biological treatment, said second portion comprising a fermentable portion and a non-fermentable portion;
   (e) liquifying said fermentable portion of said second portion of said slurry in said hydrolysis reactor;
   (f) separating the liquified slurry obtained in step (e) into
      (I) a dry portion, said dry portion including said non-fermentable portion; and
      (II) a residual liquid; and
   (g) methanizing a first portion of said residual liquid in an apparatus including an anaerobic fluidized bed.

2. The method of claim 1, comprising discharging said dry portion as a waste product.

3. The method of claim 1, comprising recycling a portion of said dry portion in said hydrolysis reactor.

4. The method of claim 1, further comprising the steps of:
   (a) nitrifying said liquid portion of the purified water in a nitrifier;
   (b) denitrifying the nitrified liquid obtained in step (a) in a denitrifier;
   (c) decanting the denitrified liquid obtained in step (b) in a decanter;
   (d) discharging the decanted liquid obtained in step (c); and
   (e) recycling the sediment obtained in step (c) in said clarifier-thickener apparatus.

5. The method of claim 4, wherein a second portion of said residual liquid is supplied to said denitrifier.

6. The method of claim 1, further comprising mixing said first portion of said residual liquid methanized in step (g) with waste water prior to introducing said waste water into said single aeration basin.

7. The method of claim 1, wherein said high mass load is equivalent to a value of about 1.5 kg BOD5/kgDM/day.

8. The method of claim 1, wherein said predetermined period of time for said waste water to dwell in said single aeration basin is about 15 minutes.

9. The method of claim 1, wherein said waste water is subjected to screening, renewing of sediments, degreasing and primary decantation prior to introducing into said single aeration basin.

* * * * *

UNITED STATES PATENT AND TRADEMARK OFFICE
CERTIFICATE OF CORRECTION

PATENT NO. : 4,787,978

DATED : November 29, 1988

INVENTOR(S) : R. NICOL

It is certified that error appears in the above-identified patent and that said Letters Patent is hereby corrected as shown below:

At column 1, line 58, change "basing" to ---basin---.

At column 3, line 34, change "denitrifier" to ---nitrifier---.

Signed and Sealed this

Twenty-sixth Day of December, 1989

*Attest:*

JEFFREY M. SAMUELS

*Attesting Officer*   *Acting Commissioner of Patents and Trademarks*